US006669206B2

(12) United States Patent
Hanke

(10) Patent No.: US 6,669,206 B2
(45) Date of Patent: Dec. 30, 2003

(54) TOOL HOLDER FOR A ROTARY HAMMER OR CHISEL HAMMER

(75) Inventor: Andreas Hanke, Bad Camberg (DE)

(73) Assignee: Black & Decker Inc., Newark, DE (US)

( * ) Notice: Subject to any disclaimer, the term of this patent is extended or adjusted under 35 U.S.C. 154(b) by 64 days.

(21) Appl. No.: 10/092,647

(22) Filed: Mar. 7, 2002

(65) Prior Publication Data

US 2002/0125652 A1 Sep. 12, 2002

(30) Foreign Application Priority Data

Mar. 7, 2001 (GB) ............................................ 0105547

(51) Int. Cl.[7] ............................................ B23B 31/107

(52) U.S. Cl. ........................................ 279/19.4; 279/74

(58) Field of Search ......................... 279/19, 19.3–19.5, 279/74

(56) References Cited

U.S. PATENT DOCUMENTS

| | | | |
|---|---|---|---|
| 1,592,521 | A | 7/1926 | Embor |
| 1,706,460 | A | 3/1929 | Norling |
| 1,792,875 | A | 2/1931 | Stevens |
| 2,270,840 | A | 1/1942 | Allen |
| 2,453,536 | A | 11/1948 | Peck |
| 2,823,040 | A | 2/1958 | Fisher |
| 4,107,949 | A | 8/1978 | Wanner et al. |
| 4,378,053 | A | 3/1983 | Simpson |
| 4,434,859 | A | 3/1984 | Rumpp et al. |
| 4,491,444 | A | 1/1985 | Rumpp et al. |
| 4,491,445 | A | 1/1985 | Hunger et al. |
| 4,502,824 | A | 3/1985 | Dohse et al. |
| 4,547,105 | A | 10/1985 | Hofle et al. |
| 4,592,560 | A | 6/1986 | Neumaier et al. |
| 4,691,929 | A | 9/1987 | Neumaier et al. |
| 4,710,079 | A | 12/1987 | Smith et al. |
| 4,775,269 | A | 10/1988 | Brix |
| 4,824,298 | A | 4/1989 | Lippacher et al. |
| 4,878,679 | A | 11/1989 | Plank et al. |
| 5,199,833 | A | 4/1993 | Fehrle et al. |
| 5,201,620 | A | 4/1993 | Forrest et al. |
| 5,316,323 | A | 5/1994 | Jovanovic |
| 5,373,905 | A | 12/1994 | Bleicher et al. |
| 5,398,946 | A | 3/1995 | Quiring |
| 5,437,465 | A | 8/1995 | Vogele et al. |
| 5,474,139 | A | 12/1995 | Odenhahl et al. |
| 5,558,478 | A | 9/1996 | Odenhahl et al. |
| 5,601,388 | A | 2/1997 | Lauterwald |
| 5,603,516 | A | 2/1997 | Neumaier |

(List continued on next page.)

FOREIGN PATENT DOCUMENTS

| | | |
|---|---|---|
| DE | 3516541 | 11/1986 |
| DE | 4310835 | 10/1994 |
| DE | 4343638 | 6/1995 |
| EP | 0668127 | 8/1995 |
| GB | 2171340 | 8/1986 |
| GB | 2276578 | 10/1994 |
| GB | 2276579 | 10/1994 |
| GB | 2322576 | 9/1998 |
| GB | 2338672 | 12/1999 |

*Primary Examiner*—Steven C. Bishop
(74) *Attorney, Agent, or Firm*—Michael P. Leary; Charles E. Yocum; John D. Del Ponti

(57) ABSTRACT

A tool holder for a rotary hammer or chisel hammer, comprising at least one locking element, a supporting ring axially movable between a position supporting the locking element in the locked position and a second position defining a first release position of the locking element and wherein the locking element comprising a shaped element which, on its radially outer side, has a single projection lying between a first recess formed at a front edge of the locking element and a second recess formed at a rear edge of the locking element and the supporting ring has on a radially inner side a single projection lying between a first recess formed at a front edge of the supporting ring and a second recess formed at a rear edge of the supporting ring.

16 Claims, 2 Drawing Sheets

U.S. PATENT DOCUMENTS

| | | | |
|---|---|---|---|
| 5,674,031 | A | 10/1997 | Bilz et al. |
| 5,706,903 | A | 1/1998 | Odendahl et al. |
| 5,709,391 | A | 1/1998 | Arakawa et al. |
| 5,954,347 | A | 9/1999 | Buck et al. |
| 5,971,403 | A | 10/1999 | Yahagi et al. |
| 6,092,814 | A | 7/2000 | Kageler |
| 6,135,461 | A | 10/2000 | Below et al. |
| 6,179,300 | B1 | 1/2001 | Baumann et al. |

TOOL HOLDER FOR A ROTARY HAMMER OR CHISEL HAMMER

This application claims priority of U.K. Patent Application No. GB 0105547.7, filed Mar. 7, 2001, the contents of which are incorporated herein by reference.

BACKGROUND OF THE INVENTION

1. Field of the Invention

The present invention relates to a tool holder for a rotary hammer or chisel hammer.

2. Description of the Related Art

Different types of tool holder are known which have a main body with, extending rearwards from the front end thereof, a receiving opening for the shank of a drill bit or chisel of the type having at least one axial groove closed at both ends. The main body is formed with at least one axially extending elongate through-opening in the wall of the main body. A locking element of smaller axial length than the through-opening is inserted in the through-opening. The locking element in a locked position is supported against outward radial displacement and, when the drill bit or chisel is inserted, engages in the at least one axial groove thereof. The locking element in a released position is displaceable radially outwards relative to the locked position. A forwardly biased supporting ring is provided on the main body, which is axially movable between a position supporting the locking element in the locked position and a second position defining the released position of the locking element. The tool holder also has an adjusting sleeve, which is axially movable to move the supporting ring between positions.

It should be mentioned that, in addition to the at least one axial groove closed at both ends, the drill bits insertable in such a tool holder generally have at least one further axial groove offset through 90° with respect to the axial groove, which further groove is open at the rear end of the drill bit and in the inserted state of the drill bit is engaged by an axial rib of the main body, by means of which the torque for rotation of the drill bit is transferred to the drill bit. Such drill bits are known, for example, as so-called SDS-Plus and SDS-Max drill bits. Since no rotary forces are transferred to chisels that are used in a chisel hammer, the shank of such a chisel often does not have an axial groove open at the rear end, but only one or two axial grooves closed at both ends, in which the locking element or elements engage to hold the chisel fixedly in the tool holder so that it has limited axial displacement.

In a known tool holder of the above-mentioned kind (EP 0 668 127 A1), there are two diametrically opposite elongate through-openings in the main body, and inserted in each of these through-openings is a locking element in the form of a cylindrical roller. In the locked position the cylindrical roller is located at the front end of the through-opening and is supported by a supporting ring against radial outward displacement. To secure this front position of the locking elements, a divided supporting plate is provided, which engages with finger-like radially inwardly directed extensions into the through-openings and is pressed by a spring into a front position, which is defined by the front or locked position of the supporting ring. By pushing back an adjusting sleeve, the supporting ring is displaced axially rearwards as far as the rear end of the locking elements into its second position. In the region in front of the supporting ring, the adjusting sleeve has an inner wall lying radially further outwards than the inner surface of the adjusting sleeve, so that the locking elements are then able to yield radially outwards into that region of the adjusting sleeve, in order to disengage from the axial grooves in the shank of the inserted drill bit or chisel and release the latter.

If a drill bit or chisel is inserted into this tool holder, then the rear end of its shank comes into contact with the front ends of the locking elements, and these are brought into engagement with the finger-like extensions of the disc projecting into the through-openings of the main body and together with the disc are displaced rearwards against spring force until they are able to yield radially outwards behind the supporting ring located in the locked position, so that the shank can be introduced further into the receiving opening until the locking elements enter its axial grooves and, as a result of the spring force acting on the supporting disc, are again moved forwards into their starting position. In that position, they are then supported by the supporting ring against outward radial displacement.

This tool holder works satisfactorily and combines a compact construction with simple assembly. But because the forces acting on the locking elements and the surrounding parts increase with heavier-duty rotary hammers and chisel hammers, the diameter and/or the length of the cylindrically shaped locking elements has to be correspondingly increased. This leads to an increase in the breadth and/or axial length of the through-openings of the main body, however, and hence to substantial material weakening. Extending the locking element moreover requires a greater axial travel of the supporting ring for displacement into its second position and also a greater axial travel of the locking element for displacement into the position in which it is able to yield radially outwards, and consequently an increase in the overall axial length of the tool holder.

It is furthermore already well known to use, instead of cylindrically shaped locking elements, shaped elements that in the locking position project beyond the periphery of the outer wall of the circumference of the main body, and which cooperate both with a radially stepped supporting ring and with a positioning ring, the positioning ring engaging by means of a finger portion in a radially outwardly open recess in the locking element. The positioning ring is spring-loaded in the forward direction and therefore presses forwards the locking element and the adjusting sleeve that is present, so that the locking element is positioned in a region of the supporting ring which supports the locking element against radially outward displacement. If the adjusting sleeve is displaced axially rearwards by the user, then the positioning ring is also displaced rearwards, and on being displaced the finger portion of the positioning ring takes the locking element with it. The locking element therefore enters a position in relation to the supporting ring in which the locking element can be displaced radially outwards, so that the inserted drill bit or chisel can be withdrawn from the receiving opening of the main body.

When a drill bit or chisel is inserted into this known tool holder, the locking elements are displaced axially rearwards by abutment of the rear end of the drill bit or chisel against the front end of the locking elements, and hence the positioning ring too is pushed rearwards against the force of the forwardly acting spring until the locking elements have reached the above-mentioned position in which they are able to yield radially outwards in the region of the supporting ring. The rear end of the drill bit or chisel then slides past the locking elements, and the spring-loaded positioning ring displaces the locking elements axially forwards into the through-openings of the main body, so that they enter the axial grooves of the shank of the drill bit or chisel and take up the position in which the supporting ring supports them against radially outward displacement.

This known construction allows the use of compact locking elements of greater strength than the roll-shaped locking elements, but, in addition to the use of a supporting ring, requires the use of a positioning ring, by means of which displacement of the locking elements is effected by movement of the adjusting sleeve. Moreover, the external shape of the locking elements is comparatively complicated, so that a complicated mould is required for manufacture, if this involves sintering, for example.

In a further known tool holder design disclosed in GB2, 338,672 the tool holder is constructed with locking elements consisting of a shaped element which, on its radially outermost side, has a recess lying between two axially spaced projections, the supporting ring has on its inside two recesses lying between three axially spaced projections, the shape of the projections of the supporting ring being matched to the shape of the recess in the locking element and the shape of the projections of the locking element being matched to the shape of the recesses in the supporting ring. In the locking position of the locking element the projections thereof abut the projections of the supporting ring and, in the second position of the supporting ring, a projection of the locking element is received in one of the recesses in the supporting ring. As a drill bit or chisel is inserted into the receiving opening, the locking element is displaced by the rear end of the drill bit or chisel rearwards against spring force into a second release position, in which the front projection of the locking element engages in the front recess in the supporting ring and the rear two projections of the supporting ring engage in the recess in the locking element. The release position is reached after an axial displacement movement that is substantially shorter than the axial length of the supporting ring. The principle advantage of this design of tool holder is that the length through which the supporting ring or the locking element must travel between the first and second positions is reduced, which can enable the tool holder to be more compact. However, the complex shape of the supporting ring and the locking elements can increase manufacturing costs. Furthermore, the locking elements are relatively long and require through holes that are longer than the locking elements, which can weaken the main body of the tool holder, which must withstand repeated heavy impacts.

SUMMARY OF THE INVENTION

The object of the invention is to produce a tool holder of the simplest possible construction and of short overall length, which is also suitable for use in high-performance rotary hammers and chisel hammers.

According to the present invention there is provided a tool holder for a rotary hammer or chisel hammer, having a main body with a receiving opening for the shank of a drill bit or chisel having at least one axial groove closed at both ends, at least one axially extending, elongate through-opening in the wall of the main body, inserted in the through-opening a locking element of smaller axial length than the through-opening, which locking element in a locked position is supported against outward radial displacement and when the drill bit or chisel is inserted, engages in the at least one axial groove thereof and, which in a release position is displaceable radially outwards relative to the locked position, and a supporting ring is axially movable between a position supporting the locking element in the locked position and a second position defining a first release position of the locking element, characterised in that the locking element consists of a shaped element which, on its radially outer side, has a single projection lying between a first recess formed at the front edge of the locking element and a second recess formed at the rear edge of the locking element, the supporting ring has on its radially inner side a single projection lying between a first recess formed at the front edge at the supporting ring and a second recess formed at the rear edge of the supporting ring, wherein the shape of the projection of the supporting ring matches the shape of the recesses in the locking element and the shape of the projection of the locking element matches the shape of the recess in the supporting ring, and in that in the locking position of the locking element the projection thereof abuts the projection of the supporting ring and, in a release position of the locking element, part of the projection of the locking element is received in one of the recesses of the supporting ring.

The locking elements and supporting ring according to the present invention are of relatively simple shape and so are accordingly relatively cheap and simple to manufacture. The locking elements are also relatively short. Furthermore, the locking elements do not have to be moved all the way past the supporting ring, or vice versa, to move into their unlocked position. This means that the through-openings in the tool holder can be relatively short and so do not unduly weaken the main body, and that the locking elements and/or the supporting ring only have to be moved a short axial distance between the locked and unlocked positions.

The tool holder may additionally include a manually actuable adjusting sleeve, which may surround the supporting ring, and which as axially moveable to move the supporting ring between positions. Preferably a spring loads the supporting ring towards its position supporting the locking element in the locked position. This ensures that the supporting ring returns to its locked position automatically after is has been moved to its second position.

In the first release position of the locking element, when the supporting ring is in its second position, it is preferred that part of the rear of the projection of the locking element is received in the first recess of at the front of the supporting ring.

In a preferred version of the tool holder into which a drill bit or chisel can be fitted without moving the supporting ring, as a drill bit or chisel is inserted into the receiving opening, the or each locking element is displaced by the rear end of the drill bit or chisel rearwards against spring force into a release position, in which a forward part of the projection of the locking element engages in the second recess at the rear edge of the supporting ring and the rearward part of the projection of the supporting ring engages in the first recess at the front edge of the locking element. In this way, the locking element is well supported in its unlocked position.

Preferably, an outer spring loads the supporting ring towards its position in which it supports the locking element in the locked position. Accordingly, when the supporting ring is moved to its second release position and a drill bit or chisel is removed, the adjusting sleeve can be released to move the supporting ring and locking element back to their locked positions (with no drill bit or chisel fitted).

To improve guidance of the locking elements between their locked and unlocked positions on insertion of a drill bit or chisel, a forwardly biased washer, which in the locked position abuts the rear end of the locking element, and in the second release position the washer is displaced rearwards together with the locking element. For improved guidance of the locking element between its locked and second release position, the washer may have an inwardly facing shoulder on its forward face which engages the rearward edge of the second recess of the locking element. The washer may also abut the rear end of the supporting ring and in the first release position the washer may be displaced rearwards together with the supporting ring. The washer may be forwardly biased by an inner spring located inwardly of the spring referred to above for forwardly biasing the supporting ring.

In order to provide adequate damping of the impact to the locking elements on entry into idle mode of the hammer, the locking element is preferably supported in the locked position with its front end against a resiliently deformable support.

The inserted locking element is preferably symmetrically shaped both with respect to an axial plane extending through the centre of the locking element and with respect to a radial plane extending through the centre of the locking element. This means that the locking element cannot be assembled in an incorrect orientation within the through-openings. For the same reason it is preferred that the supporting ring is symmetrically shaped with respect to a radial plane extending through the centre of the supporting ring. In particular the projection of the supporting ring may be in the form of an annular rib.

In a preferred embodiment of the present invention, the projection of the locking element is of trapezoidal cross-section in axial section and tapers radially outwards in this sectional plane, and the projection of the supporting ring is of trapezoidal cross-section in axial section and tapers radially inwards in this sectional plane at the same slope as the projection of the locking element. This with provide smooth transitions between the relative positions between the locking element and the supporting ring.

In an especially preferred embodiment there are two locking elements, each of which are received in one of two through-openings in the main body.

According to a second aspect of the present invention there is provided a rotary or chisel hammer comprising a tool holder as described above.

BRIEF DESCRIPTION OF THE ATTACHED DRAWINGS

The invention is explained in detail in the following with reference to the Figures illustrating an exemplary embodiment:

DETAILED DESCRIPTION OF THE PREFERRED EMBODIMENT

Figure 1:
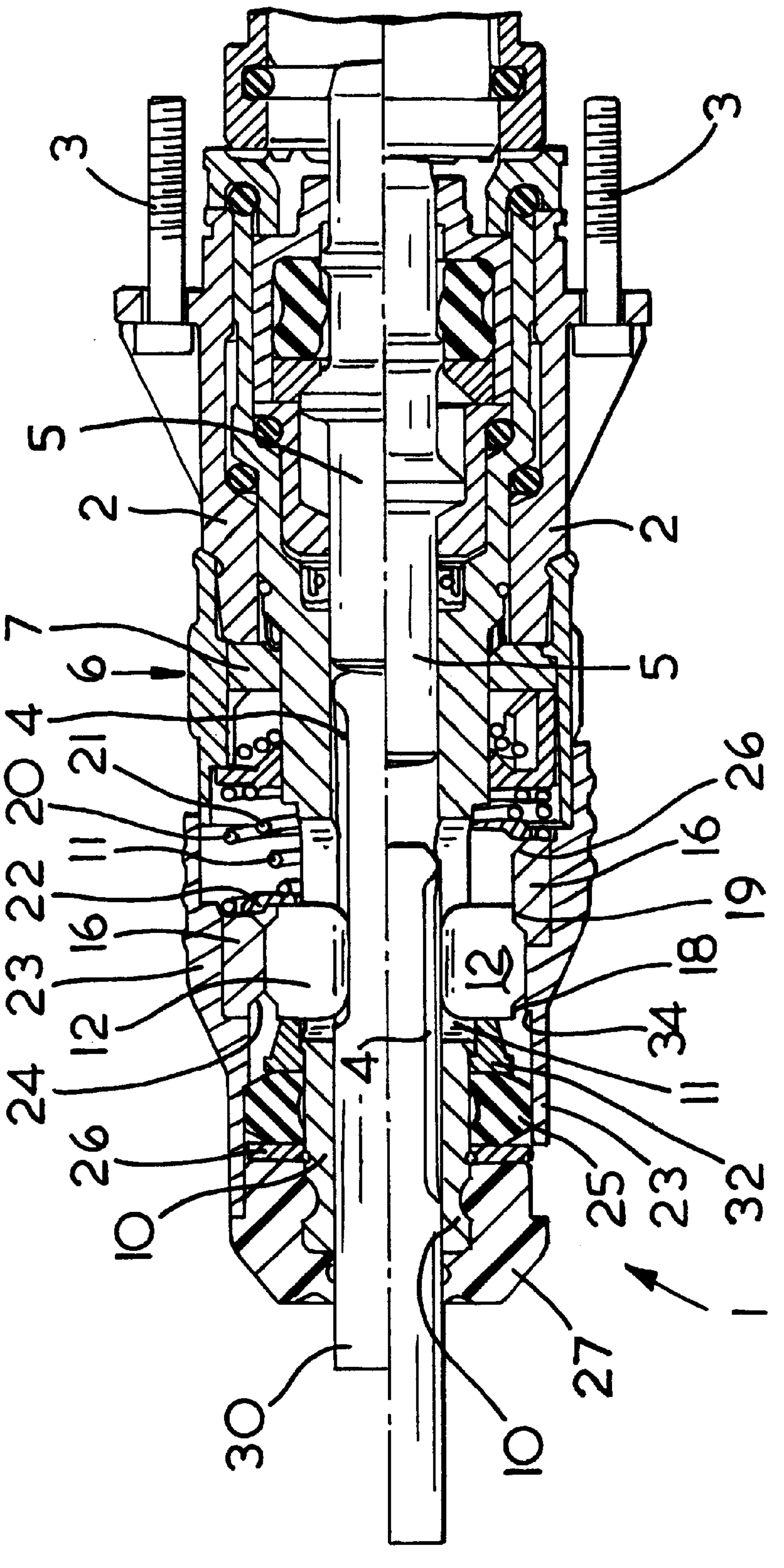
FIG. 1 shows in section a tool holder with components provided at the front part of a chisel hammer, in the upper half with the locking elements positioned in the locking position and in the lower half with the locking element positioned in its release position on removal of a chisel.

A preferred embodiment according to the present invention will be described hereinafter with reference to the attached drawings.

The tool holder 1 illustrated has a sleeve-shaped main body 10, which has a continuous coaxial receiving opening 10', the diameter of which in the rear region is greater than in the front region. The main body 10 sits with its rear end in a housing part 2, consisting of metal, of the chisel hammer, not otherwise shown. This housing part 2 is secured in the customary manner to the front end of the hammer housing containing drive motor and impact mechanism, using a plurality of screws 3. The impact mechanism of the hammer is of conventional design in which the impacts generated by the impact mechanism are transmitted via a beatpiece 5 to the rear end of a tool or chisel 30, which is inserted into the tool holder 1 and with its front end engages a work piece.

On the front end of the housing part 2 there is seated an alignment sleeve 6, rotation of which axially shifts a lock ring 7. The lock ring 7 is non-rotatably mounted on the main body 10. By means of sets of teeth on the lock ring 7 and on the housing part 2, the lock ring 7 in its locked position holds the main body 10 against rotation relative to the housing part 2 and hence relative to the chisel hammer. By rotating the alignment sleeve 6 the lock ring 7 is axially shifted out of engagement with the housing part 2 so that further rotation of the alignment sleeve 6 by the user rotates the main body 10, and hence the chisel 30 inserted therein, relative to the housing part 2 and hence relative to the chisel hammer into a desired angular position. Once this has been reached, the alignment sleeve 6 is released and returns under spring force into its original position to bring the lock ring 7 back into engagement with the housing part 2.

In the front region of the main body 10 where the receiving opening 10' is of smaller cross-section, on opposite sides in the wall of the main body there are formed axially extending through-openings 11. A locking element 12 which can comprise, for example, a sintered shaped body, is located in each of the through-openings 11.

Figure 2:
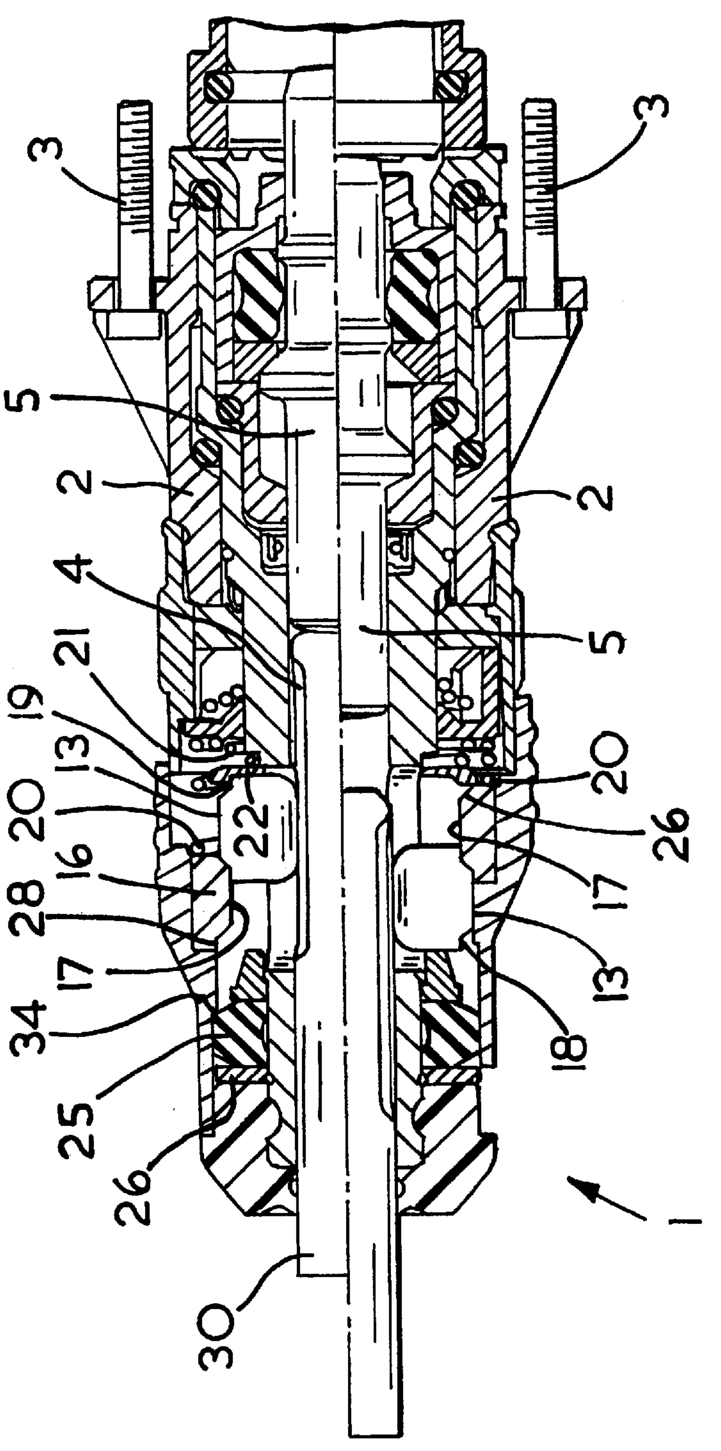
FIG. 2 shows, a view corresponding to FIG. 1, in the upper half with the locking element in its release position on insertion of a chisel and in the lower half the locking element in its release position on removal of a chisel.
Figure 3:
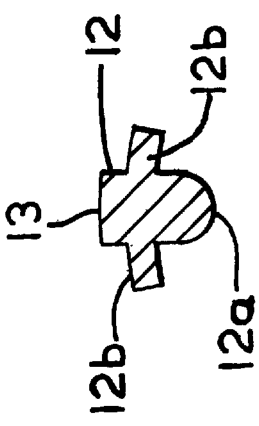
FIG. 3 shows a section through a radial plane through the centre of a locking element of FIG. 1 or FIG. 2.

The cross-section through a radial plane through the centre of the locking elements is shown in FIG. 3. As can be seen from FIG. 3 the radially inner ends 12*a*, of the locking elements have a surface which is curved in a circular arc, which matches the arcuate cross section (in a radial plane) of the groove 4 formed in the chisel 30. The locking elements 12 are each provided with a pair of arcuate arms 12*b* which engage the edges of the through-openings 11 to prevent the locking elements from passing through the through-openings 11. The axial length of the locking elements 12 is, as is apparent from FIGS. 1 and 2, is shorter than the axial length of the through-openings 11 receiving them. The locking elements 12 are inserted into the through-openings 11 in such a way, and their cross-sectional shape and the cross-sectional shape of the receiving openings 11 are so matched to one another, that the locking elements 12 can be displaced in the manner apparent from the Figures and to be described in detail hereinafter, between a radially inner and a radially outer position. In axial section, as shown in FIGS. 1 and 2, each locking element 12 has at its radially outer side a single projection 13, flanked by a forward recess 18 at the front edge of the locking element and a rearward recess 19 at the rear edge of the locking element. The single projection 13 has a radially outer surface which is slightly arcuate, in the circumferential direction, as shown in FIG. 3. The recesses 18 and 19 each have a slightly arcuate base (in the circumferential direction) connected to the single projection 13 by a sloping connecting surface. The locking elements 12 are of symmetrical construction with respect to a radial plane through the centre of the locking element 12 and with respect to an axial plane through the centre of the locking element 12. They can therefore be inserted into the through-opening 11 in any axial alignment, that is, there is no risk that the locking elements 12 will be inserted into the through openings 11 the wrong way around during assembly.

As is especially apparent from FIGS. 1 and 2, the locking elements 12 co-operate with a supporting ring 16, which on its radially inner side has a single projection 17. The single projection 17 has an arcuate surface (in a circumferential direction) which matches the curve of the arcuate surfaces of the projection 13 and the bases of the recesses 18 and 19 of the locking element 12. The single projection 17 is flanked by a forward recess 28 at the front edge of the supporting ring and a rearward recess 26 at the rear edge of the supporting ring. The recess 28 has an arculate base (in the circumferential direction) connected to the single projection 17 by a sloping connecting surface. The arcuate base of the recess 28 matches the curve of the arcuate surface of the projection 13 and of the bases of the recesses 18, 19 of the locking elements 12. The recess 26 is defined by a sloping surface extending radially outwardly and axially rearwardly from the single projection 17. The sloping surfaces of the recesses 18, 19, 26 and 28 all slope at the same angle relative to the radial plane of the tool holder 1.

An outer spring 20 acts on the rear side of the supporting ring 16, the spring being supported with its rear end against a washer 40, which abuts the front a forward facing internal shoulder of the alignment sleeve 6. The supporting ring 16 is consequently always spring-loaded in the forward direction. An inner spring 21 is likewise supported on the washer 40 abutting the alignment sleeve 6, and with its front end abuts a washer 22 which, in the position shown in the upper half of FIG. 1, abuts both the rear end of the locking elements 12 and the rear end of the supporting ring 16. In that position, the front end of the supporting ring 16 is supported against an adjusting sleeve 23 that surrounds it, which has an internal shoulder 34, which in this state abuts an annular damping element 25, which is supported against a supporting washer 26 that is prevented from being displaced forwards by a circlip seated in an annular groove of the main body 10, whilst the front end of the locking elements 12 in this position abuts an annular, resiliently deformable support 32.

In front of the supporting washer 26, a sealing cap 27 is pushed from the front onto the main body 10 in the customary manner.

In the position already mentioned shown in FIG. 1, the shank 30 of a chisel is inserted into the tool holder 1. In the customary manner, the shank has two opposing axial grooves 4 closed at both ends. In the upper half of FIG. 1, the radially inner portion 12*a* of the locking elements 12 extend into these axial grooves, and the locking elements 12 are braced against radial outward displacement by alignment of their single projections 13 with the single projections 17 of the supporting ring 16, corresponding to a locked position. In operation, the chisel 30 is therefore able to move back and forth in the usual manner, commensurate with the axial extent of the axial grooves 4, but is held by the locking elements 12 to prevent it from escaping from the receiving opening 10' of the main body 10.

To remove the chisel from the tool holder 1, the user displaces the adjusting sleeve 23 by hand against the force of the outer spring 20 and the inner spring 21 out of the position shown in the top half of FIG. 1 and rearwards into the position shown in the lower half of FIGS. 1 and 2. During this displacement movement, the adjusting sleeve 23 takes the supporting ring 16 with it. When the projection 17 of the supporting ring 16 reaches the region of the base of the recess 19 of the locking elements 12, the locking elements 12 can be displaced radially outwards in the manner indicated in the lower half of FIGS. 1 and 2, without the supporting ring 16 having to be displaced rearwards over the entire axial extent of the locking elements 12. In this radially outwardly displaced position, the locking elements 12 are supported by the supporting ring 16 and by the internal surface of the adjusting sleeve 23 in a defined state, corresponding to a first release position. This is because shape of the front part of the supporting ring and the internal surface of the adjusting sleeve 23 exactly match the shape of the rear part of the locking element 12. In this way the projections of the one component fit exactly into the recess in the other component.

In the first release position illustrated in the lower half of FIGS. 1 and 2, the chisel 30 can then, as indicated, be removed from the receiving opening 10' of the main body 10. When the adjusting sleeve 23 is afterwards released, the springs 20, 21 press the supporting ring 16 via the washer 22, and hence also the adjusting ring 23, forwards again into the locked position shown in the upper half of FIG. 1. In the upper half of FIG. 1 the locking elements 12 are also held in this front position by the spring-loaded washer 22 bearing against them.

If the shank 30 of a chisel is inserted into the receiving opening 10' of the main body 10, then the rear end of the chisel shank 30 comes into contact with the front end of the locking elements 12. As the chisel shank 30 is introduced further, it displaces the locking elements 12 axially rearwards in the through-openings 11 until the single projection 13 of the locking elements 12 is positioned in the region of the recess 26 of the supporting ring 16, so that the locking elements 12 are able to yield radially outwards into a second release position, as shown in the upper half of FIG. 2. The sloping surfaces at the front of the single projections 13 of the locking elements 12 engage the sloping surfaces of the recess 26 of the supporting ring 16, without the locking elements 12 having to be displaced rearwards over the entire axial extent of the supporting ring 16. The locking elements 12 are supported in the second release position shown in the upper half of FIG. 2 at their forward end by the shape of the front part of the locking element, in particular the single projection 13 and forward recess 18 exactly matching the shape of the rear part of the supporting ring, in particular the single projection 17 of the supporting ring and the recess 26. The locking elements 12 are supported in the second release position shown in the upper half of FIG. 2 by the edge of the recess 19 of the locking element engaging an annular shoulder in the forward facing face of the washer 22. In this position of the locking elements 12, the rear end of the chisel shank 30 can slide past the locking elements 12, until the locking elements 12 are again located entirely in the region of the axial grooves 4 of the chisel shank 30. Once this position has been reached, the pressure of the inner spring 21 causes the washer 22, and hence the locking elements 12, to be displaced forwards from the position shown in the top half of FIG. 2 again into the locked position shown in the upper half of FIG. 1, and the chisel is thus securely held in the receiving opening 10' of the main body 10 so that it has limited axial movement back and forth.

What is claimed is:

1. A tool holder for a rotary hammer or chisel hammer, comprising:

a main body defining a receiving opening for the shank of a drill tool having at least one axial groove closed at both ends, at least one axially extending, elongate through-opening defined by the main body, a locking element located in the through-opening and having a smaller axial length than the through-opening, which locking element in a locked position is supported against outward radial displacement and when the drill tool is inserted, engages in the at least one axial groove thereof and, which in one of a first release position and a second release position is displaceable radially outwards relative to the locked position, a supporting ring, which is axially movable between a first position supporting the locking element in the locked position and a second position defining the first release position of the locking element, and the locking element comprises a shaped element which, on its radially outer side, has a single projection lying between a first recess formed at a front edge of the locking element and a second recess formed at a rear edge of the locking element, the supporting ring has a radially inner side including a single projection lying between a first recess formed at a front edge of the supporting ring and a second recess formed at a rear edge of the supporting ring, wherein the shape of the projection of the supporting ring matches the shape of the recesses in the locking element and the shape of the projection of the locking element matches the shape of the recesses in the supporting ring, and wherein in the locked position the projection of the locking element abuts the projection of the supporting ring and, in the release position of the locking element, a part of the projection of the locking element is received in one of the recesses of the supporting ring.

2. A tool holder according to claim 1 additionally comprising a manually actuable adjusting sleeve, surrounding the supporting ring and axially movable to move the supporting ring between the first position and the second position.

3. A tool holder according to claim 1 wherein an outer spring loads the supporting ring towards the first position supporting the locking element in the locked position.

4. A tool holder according to claim 1 wherein in the first release position of the locking element, a part of the projection of the locking element is received in the first recess of the supporting ring.

5. A tool holder according to claim 1 wherein, as a drill tool is inserted into the receiving opening, the locking element is rearwardly displaced by the drill tool against a spring into a second release position, in which second release position a part of the projection of the locking element engages in the second recess at the rear edge of the supporting ring and a part of the projection of the supporting ring engages in the first recess at the front edge of the locking element.

6. A tool holder according to claim 1 wherein, as a drill tool is inserted into the receiving opening, the locking element is rearwardly displaced by the drill tool against a spring into a second release position, in which second release position a part of the projection of the locking element engages in the second recess at the rear edge of the supporting ring and a part of the projection of the supporting ring engages in the first recess at the front edge of the locking element and further comprising a forwardly biased washer which in the locked position abuts the rear end of the locking element, and in the second release position the washer is displaced rearwardly together with the locking element.

7. A tool holder according to claim 1 wherein, as a drill tool is inserted into the receiving opening, the locking element is rearwardly displaced by the drill tool against a spring into a second release position, in which second release position a part of the projection of the locking element engages in the second recess at the rear edge of the supporting ring and a part of the projection of the supporting ring engages in the first recess at the front edge of the locking element, and further comprising a forwardly biased washer which in the locked position abuts the rear end of the locking element, and in the second release position the washer is displaced rearwardly together with the locking element and the washer includes a shoulder on a forward face which engages a rearward edge of the second recess of the locking element to guide the locking element between the locked position and the second release position.

8. A tool holder according to claim 1 wherein, as a drill tool is inserted into the receiving opening, the locking element is displaced rearwardly by the drill tool against a spring into a second release position, in which second release position a part of the projection of the locking element engages in the second recess at the rear edge of the supporting ring and a part of the projection of the supporting ring engages in the first recess at the front edge of the locking element, and further comprising a forwardly biased washer which in the locked position abuts the rear end of the locking element, and in the second release position the washer is displaced rearwardly together with the locking element and the washer also abuts the rear end of the supporting ring and in the first release position the washer is displaced rearwardly together with the supporting ring.

9. A tool holder according to claim 1 wherein, as a drill tool is inserted into the receiving opening, the locking element is displaced rearwardly by the drill tool against a spring into a second release position, in which a part of the projection of the locking element engages in the second recess at the rear edge of the supporting ring and a part of the projection of the supporting ring engages in the first recess at the front edge of the locking element, and further comprising a forwardly biased washer which in the locked position abuts the rear end of the locking element, and in the second release position the washer is displaced rearwardly together with the locking element and wherein the washer is forwardly biased by an inner spring.

10. A tool holder according to claim 1 wherein the locking element is supported in the locked position with a front end against a resiliently deformable support.

11. A tool holder according to claim 1 wherein the locking element is symmetrically shaped both with respect to an axial plane extending through the centre of the locking element and with respect to a radial plane extending through the centre of the locking element.

12. A tool holder according to claim 1 wherein the supporting ring is symmetrically shaped with respect to a radial plane extending through the centre of the supporting ring.

13. A tool holder according to claim 1 wherein the projection of the locking element is of trapezoidal cross-section in axial section and tapers radially outwards in this sectional plane, and the projection of the supporting ring is of trapezoidal cross-section in axial section and tapers radially inwards in this sectional plane at the same slope as the projections of the locking element.

14. A tool holder according to claim 1 wherein the projection of the supporting ring is in the form of an annular rib.

15. A tool holder according to claim 1 wherein the main body defines two through-openings.

16. A rotary or chisel hammer including a tool holder comprising:

a main body defining a receiving opening for the shank of a drill tool having at least one axial groove closed at both ends, at least one axially extending, elongate through-opening defined by the main body, a locking element located in the through-opening and of smaller axial length than the through-opening, which locking element in a locked position is supported against outward radial displacement and when the drill tool is inserted, engages in the at least one axial groove thereof and, which in one of a first release position and a second release position is displaceable radially outwards relative to the locked position, a supporting ring, which is axially movable between a first position supporting the locking element in the locked position and a second position defining the first release position of the locking element, and the locking element comprising of a shaped element which, on a radially outer side, has a single projection lying between a first recess formed at a front edge of the locking element and a second recess formed at a rear edge of the locking element, the supporting ring has on its radially inner side a single projection lying between a first recess formed at a front edge of the supporting ring and a second recess formed at a rear edge of the supporting ring, wherein the shape of the projection of the supporting ring matches the shape of the recesses in the locking element and the shape of the projection of the locking element matches the shape of the recesses in the supporting ring, and wherein in the locking position, the projection of the locking element abuts the projection of the supporting ring and, in the release position of the locking element, a part of the projection of the locking element is received in one of the recesses of the supporting ring.

* * * * *